United States Patent [19]

Irani et al.

[11] Patent Number: 5,146,228
[45] Date of Patent: Sep. 8, 1992

[54] COHERENT CORRELATION ADDITION FOR INCREASING MATCH INFORMATION IN SCENE MATCHING NAVIGATION SYSTEMS

[75] Inventors: Geoffrey B. Irani, Columbia; Kim T. Constantikes, Ellicott City; Gary D. Shiflett, Columbia, all of Md.

[73] Assignee: The Johns Hopkins University, Baltimore, Md.

[21] Appl. No.: 469,875

[22] Filed: Jan. 24, 1990

[51] Int. Cl.$^5$ .............................................. G01C 11/12
[52] U.S. Cl. ........................................ 342/64; 356/2; 382/42
[58] Field of Search ............... 382/1, 30; 364/456; 358/109; 342/62, 63, 64; 350/320; 356/2

[56] References Cited
U.S. PATENT DOCUMENTS 4,802,757 2/1989 Pleitner et al. ..................... 356/2
4,925,274 5/1990 James et al. .......................... 342/64

Primary Examiner—Thomas H. Tarcza
Assistant Examiner—David Cain
Attorney, Agent, or Firm—Francis A. Cooch

[57] ABSTRACT

A method and apparatus are described for image matching, particularly for increasing match information in scene matching navigation systems. The invention correlates a sequence of sensed images with a reference map and stores the resultant correlation surfaces. The correlation surfaces are then added so that match point correlations combine coherently by superposing the individual correlation surfaces using short term accurate navigation data. As a result, a composite correlation surface is formed in which the values at the peak (or antipeak) position add up and the effective match area is greatly increased. Both peaks and antipeaks are then detected to determine a match point and provide a navigation position update.

26 Claims, 11 Drawing Sheets

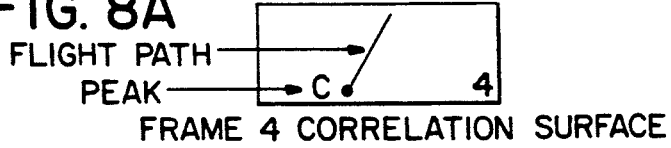
FRAME 4 CORRELATION SURFACE
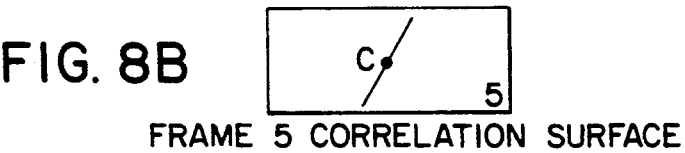
FRAME 5 CORRELATION SURFACE
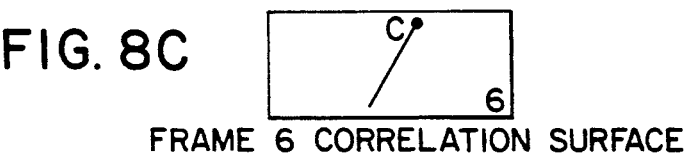
FRAME 6 CORRELATION SURFACE
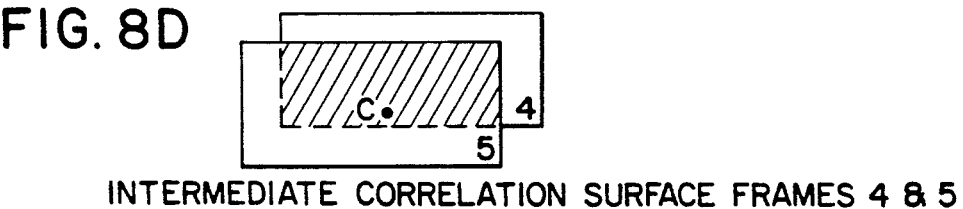
INTERMEDIATE CORRELATION SURFACE FRAMES 4 & 5
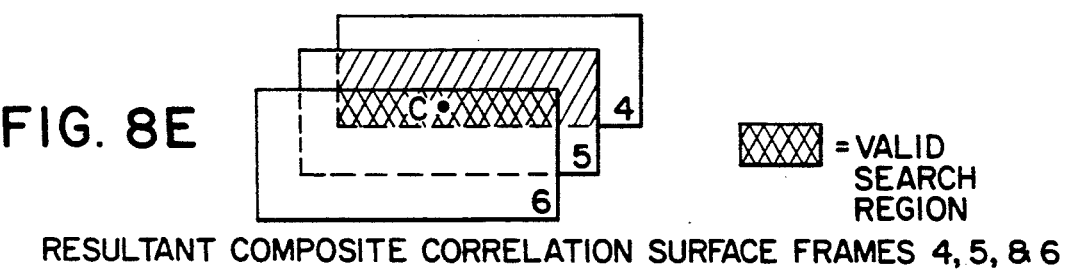
RESULTANT COMPOSITE CORRELATION SURFACE FRAMES 4, 5, & 6

COHERENT CORRELATION ADDITION FOR INCREASING MATCH INFORMATION IN SCENE MATCHING NAVIGATION SYSTEMS

STATEMENT OF GOVERNMENTAL INTEREST

The Government has rights in this invention pursuant to Contract No. N00039-89-C-5301 awarded by the Department of the Navy.

BACKGROUND OF THE INVENTION

The invention relates to image processing and, more specifically, to an improved method and apparatus for use in scene matching navigation systems.

Image matching plays an important role in the navigation of both manned and unmanned aircraft (hereinafter airframe). Autonomous image (scene) matching navigation systems have been developed that use the optical features of the terrain to provide accurate navigation position updates and, consequently, accurate guidance.

Generally, terrain (scene) images (frames) obtained (sensed) in-flight by an on board video camera are matched (correlated) with a previously obtained and stored reference map whose position is precisely known. Once the match point between the sensed image or frame (hereinafter sensed image and frame are used interchangeably) and the map is found, the match point can be combined with sensor perspective and altitude as well as map position to update the airframe's inertial navigator. (See E. H. Conrow and J. A. Ratkovic, "Almost Everything One Needs to Know about Image Matching Systems," *Image Processing for Missile Guidance.* Proc. Soc. Photo-Opt. Instru. Eng. 238, pp. 426–453 (1980).) One image matching system (correlator) used in current missiles is described in J. R. Carr and J. S. Sobek, "Digital Scene Matching Area Correlator," *Image Processing for Missile Guidance,* Proc. Soc. Photo-Opt. Instru. Eng. 238, pp. 36–41 (1980).

As shown in FIG. 1, long before the airframe is in flight, images of scenes are obtained by reconnaissance and transmitted to a processing center. Then, during mission planning, the guidance uncertainties in both range (downtrack direction) and crossrange (guidance uncertainty plus an allowance for airframe body motion) are determined by computer simulations. Reference maps are then prepared for each scene from the previously obtained images and are sized to the mission requirements, but are always larger than the sensed image to be obtained by the airframe camera while in-flight. However, to minimize memory storage and the probability of false update, a map is only made large enough to ensure that enough sensed images will be acquired entirely within the reference map to ensure update reliability.

The airframe guidance system controls the operating period of the image matching system by the use of discrete commands issued over a serial data bus. These commands cause the image matching system to sense and correlate (match) images throughout the entirety of the range of navigational position uncertainty.

Referring again to FIG. 1, during flight, upon receipt of the appropriate command, a camera (e.g., RS-I70 video camera) on board the airframe senses the terrain below and acquires a time sequence of sensed images dependent upon the airframe motion, angular field of view (FOV), altitude, perspective, and the sensed image acquisition rate. The sensed images are either acquired with or corrected to the reference map's scale and heading; their relative positions are related to the velocity, altitude and attitude of the airframe, which quantities are measured by the airframe guidance system. Finally, the sensed images are processed to enhance features and compress the data to manageable amounts.

During processing of each original video image, a low resolution, single bit, two-dimensional match template is computed. This process may include linearly correcting sensor image brightness errors that arise from vignetting and nonuniform response in the sensor; and will include forming lower resolution pixels (called cells) by low-pass filtering and decimating the high resolution image, resulting in a field of view (FOV) with a size $K \times L$ cells that is limited by maximum dimensions that maximize correlation Peak-to-Sidelobe Ratio (PSR) (a measure of correlator performance) (Note, this limit on FOV results from the fact that geometry errors cause the correlation peak to degrade faster than the standard deviation of the sidelobes as the FOV size increases); filtering to enhance the salient features of the cell-sized image and to remove the image mean; and thresholding the filter output at zero for each cell to yield a zero (cell filtered gray level is less than zero) or one (cell filtered gray level is greater than or equal to zero).

The processed sensed images are then correlated with the reference map as shown in FIG. 2. Each sensed image is compared with every possible location that is entirely within the reference map and a correlation match level (amplitude) (hereinafter level and amplitude are used interchangeably) is computed for each location. The correlation levels for each sensed image together form a correlation surface (see FIG. 3 on the left; to the right is a corresponding histogram of correlation levels). Any correlation level in the correlation surface that exceeds a preset threshold is considered significant and recorded in memory along with the x,y location of the event and the sensed image number. Sensed images are numbered one (1) to N as the airframe flies through the uncertainty area that encompasses the reference map. For each sensed image correlating above a planned threshold, the x,y position of the last highest correlation is identified. These x,y positions from a sequence of sensed images are compared for consistency with the airframe motion, the motion being known by the airframe's inertial guidance unit.

A valid correlation between a sensed image and a segment of the reference map usually yields a cluster of significant correlations around the correlation peak. Conversely, an invalid sensed image resulting from it being taken outside of the map area usually produces no significant correlations. The last best correlation peak, once determined, can then be used to identify the match point between the reference map and the sensed image and provide a navigation update to the airframe guidance system, if the threshold and position-consistency criteria are met.

Image matching system update-position detectors apply a fixed correlation-peak threshold, precomputed during mission planning, to correlations. As previously noted, correlation levels for each sensed image exceeding the threshold are stored in memory, along with the position of each level. Then, the stored levels are sorted to find the greatest. Finally, two of the three update positions from a sequence of three sensed images must be consistent with the motion and attitude change of the airframe before an update is sent to the guidance system.

Although image matching systems have been implemented and are in use, problems remain. While such systems are intended to operate in many environmental conditions, it is difficult to find scenes that provide navigation updates for all times of day, seasons, and weather. In fact, the fashion in which scenes change, as seen by a particular sensor over time, is the major problem image matching systems face. These scene changes are generically known as instabilities, examples of which are:

a. shadows caused by diurnal variations in lighting that cause anti-correlations or no match at all,
b. seasonal variations caused by flora cycles that may also cause anti-correlations or no match at all,
c. changes in cultural features (e.g., a housing development) caused by construction or demolition, and
d. precipitation where snow and standing water can cause features on the ground to be obscured or radically changed.

In addition to problems caused by scenes changing, the following scenes are currently unsuitable for correlation because of the nature of their fixed character:

a. low contrast scenes, caused by scene reflectance or irradiance, that cause the sensed image contrast to be low and thus sensor noise to dominate the sensed image,
b. scenes with poor feature content, meaning that the observable features are too large or small and, hence, there is insufficient match information at practical resolution sizes, and
c. inhomogeneous scenes, where some regions in the scene are suitable for correlation but other regions are not.

Image matching systems need signal processing improvements that provide reliable navigation updates over degraded scenes by reducing or eliminating the effect of scene instabilities and other causes of poor correlation.

SUMMARY OF THE INVENTION

The problems described above are solved, to a great extent, through the practice of the invention. In short, the invention substantially improves navigation update reliability by increasing the quantity of information available for matching (correlation), i.e., by increasing the match area, and testing both correlation and anti-correlation extremes against a threshold that adapts to the standard deviation of actual correlation levels excluding the extremes. Increased match information is effected by using inertial guidance data, e.g., airframe velocity, altitude and attitude, to add sequences of correlation surfaces so that correct match amplitudes coherently combine, rather than simply using the correlation surface from a single sensed image to determine a match point.

In an implementation of the invention, a correlator accepts and stores a series of preprocessed, binary images from the sensor (e.g., video camera). Each individual sensed image is then correlated with a previously obtained and stored reference map, also in binary form, to generate a correlation surface output. A composite correlation surface is then formed by adding the multiple correlation surfaces generated from the sequence of consecutive sensed images. Adding of surfaces is accomplished by shifting each individual correlation surface by the number of surface elements corresponding to the relative displacements of the sensed images, these displacements being computed from airframe inertial guidance data. Consequently, the amplitude at the match point increases while the amplitudes at the mismatch points (correlation sidelobes) approaches the mean amplitude. This addition process is called coherent correlation addition, since the superposition of correlation surfaces using airframe guidance velocity, altitude and attitude data coherently adds the match amplitudes of successive correlation surfaces.

Once formed, the composite correlation surface is then searched for maximum and minimum correlation levels. These levels as well as their locations are stored. Additionally, the composite surface is made available to the match point detector, which measures actual sidelobe amplitudes and adjusts the threshold for accepting the position fix accordingly so that the reliability of the fix meets or exceeds the planned level.

If a position update is not achieved, the correlation surface from the oldest sensed image is subtracted from the composite correlation surface and a new sensed image is accepted and its correlation surface is added to the composite surface. This process is called moving window correlation addition because a finite number of sensed images (a window) moves over the reference map to determine the best composite match point. If an update is achieved, the correlator stops processing for the remainder of that particular reference area overflight. The correlator remains in an inactive state until it is reinitialized by the system controller for the next reference area.

Thus, the invention of coherently adding correlation surfaces increases the match area used by the system to identify airframe location and, therefore, its ability to match images in all seasons, hours of the day, and types of weather.

For a more complete appreciation of the invention, attention is invited to the following detailed description of a preferred embodiment of the invention taken with the figures of the drawings. The scope of the invention, however, is limited only through the claims appended hereto.

BRIEF DESCRIPTION OF THE DRAWINGS

FIG. 8 is a schematic representation of composite correlation surface generation.

DETAILED DESCRIPTION OF THE PREFERRED EMBODIMENT

As described above, the invention solves the prior art problems by coherently adding the match points of individual correlation surfaces and adaptively testing for match reliability and thereby increasing the match area available to the system.

To aid in understanding the invention, a general discussion of correlation in the image matching system context is provided first, beginning with a definition of the images that will be matched. The reference map $r(n,m)$ is the previously prepared representation (image) of the area in which we wish to acquire a navigation update. The region of match support for (size of) the reference map is a rectangle divided into N (rows) by M (columns) elements, in which each element may take values of plus or minus one. The map is defined to be zero outside of this rectangle. (Note, the upper left corner of an image region of support is the index (0,0), and indices increase left to right, top to bottom.) Therefore, let $$r(n,m) \in \{-1,1\} \text{ for } \quad 0 \leq n \leq N - 1 \quad (1)$$
$$0 \leq m \leq M - 1$$
$$= 0 \text{ otherwise.}$$

The sensed image $s(k,l)$, K x L elements in size, is the image prepared from a snapshot taken by the on-board video camera (using short exposure to suppress motion blurring) during the airframe overflight of a neighborhood of the reference area. Let $$s(k,l) \in \{-1,1\} \text{ for } \quad 0 \leq k \leq K - 1 \quad (2)$$
$$0 \leq l \leq L - 1$$
$$= 0 \text{ otherwise.}$$

The region of support for the sensed image, also denoted as a frame, is assumed smaller than the reference region. Thus $$K < N, L < M .$$

(In order that image matching by correlation provide the desired navigation update to the airframe inertial guidance, at least one, and preferably three or more, of the sensed images must be taken within the reference area. This is accomplished by ensuring that the size of t he reference area is larger than the a-priori uncertainty of the airframe position plus the dimensions of a frame, the allowance for attitude and altitude, and, in the flight direction, the distance flown during the acquisition of the planned number of matchable frames.)

The correct match point of $s(k,l)$ within $r(n,m)$ is determined from the correlation level (amplitude), $c(n,m)$, where $$c(n,m) = \sum_{k=0}^{K-1} \sum_{l=0}^{L-1} r(n + k, m + l) s(k,l)$$
$$= r \cdot s.$$

This amplitude $c(n,m)$ counts the number of elements, also denoted as cells, of $s(k,l)$ that match the cells of $r(n,m)$ minus the number that do not match when the upper left corner of s corresponds to the position $(n,m)$ in the reference map.

$c(n,m)$ is valid when all the participating cells of the sensed image are from within the reference map's region of support, i.e., $$0 \leq n \leq N-K$$

and $$0 \leq m \leq M-L.$$

Figure 1:
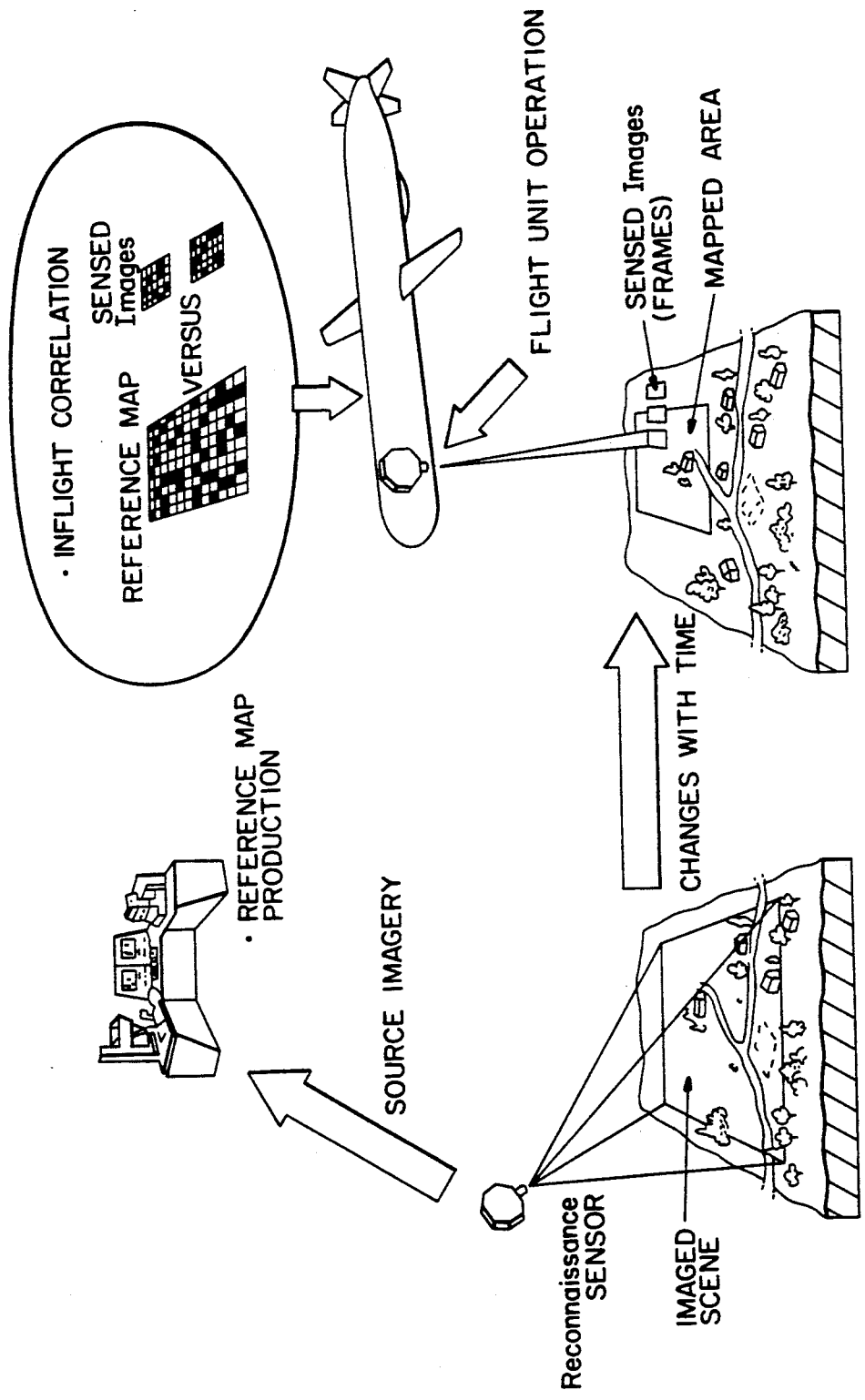
FIG. 1 illustrates the general operational concept of an image matching system.
Figure 2:
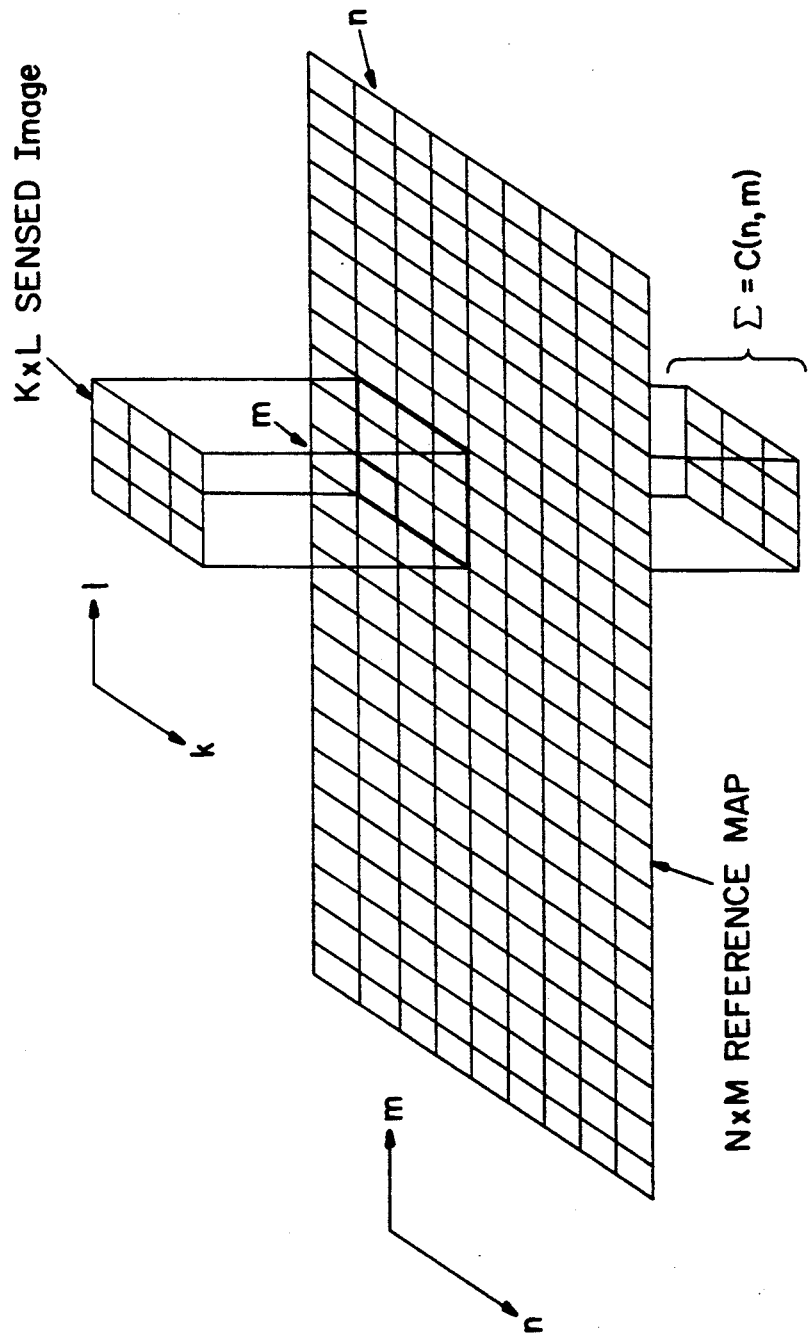
FIG. 2 is a schematic representation of the correlation process.
Figure 3B:
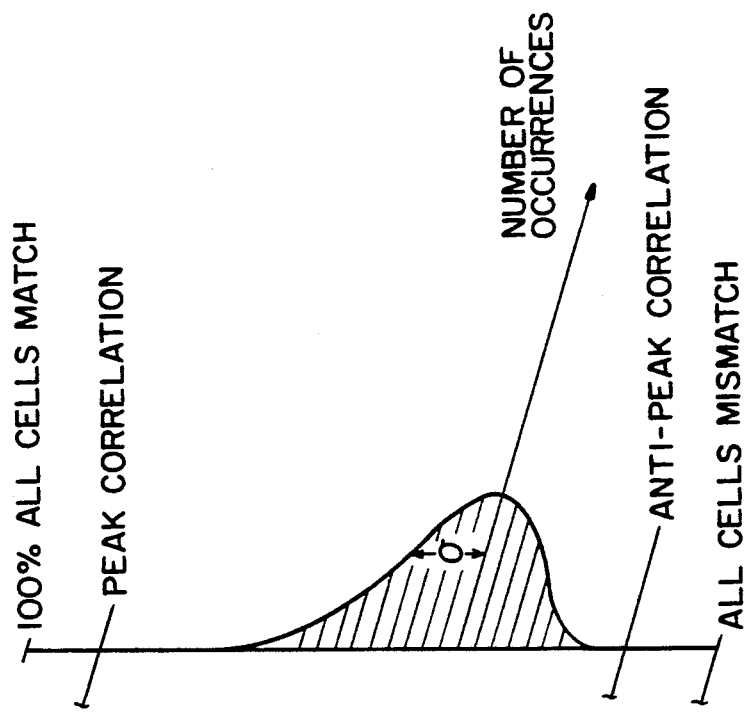
FIG. 3 is a schematic representation of a typical correlation surface.
Figure 3A:
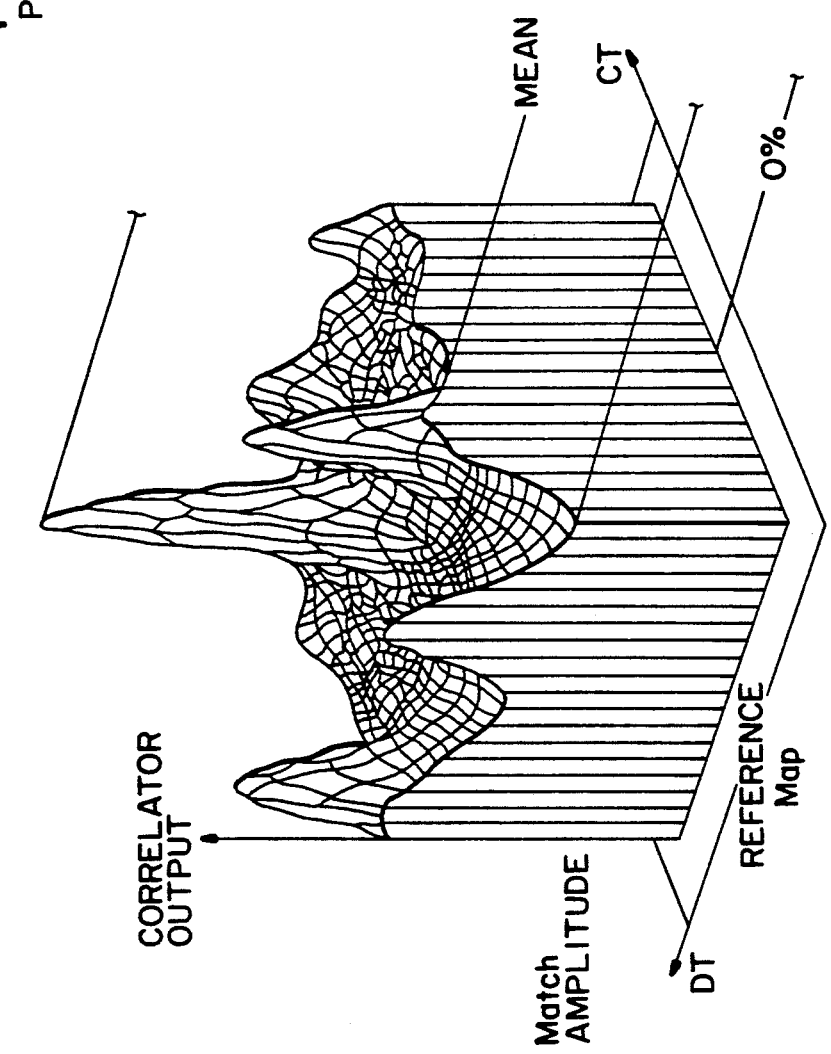

Image matching system correlation consists of matching a sensed image against every possible location in the reference map and computing $c(n,m)$ at each location to determine which provides the best match. The resultant match amplitudes $(c(n,m))$ form a three-dimensional correlation surface (FIG. 3). The $c(n,m)$ amplitudes, therefore, are the correlation surface for one sensed image (frame). As discussed above, a conventional system selects amplitudes that exceed a previously determined fixed threshold, stores these in memory and then sorts them to find the largest correlation peak (or lowest anti-correlation peak) and its location. The peak amplitude (or anti-correlation peak amplitude) is then used to determine the match point between the reference map and the sensed image in order to provide a navigation update to the airframe guidance system.

While image matching system correlators operate effectively for a variety of situations, they become less effective for unsuitable scenes as defined above. Further, the geometric distortion of the FOV and the relatively short correlation length of the sensed image features prevent cells at the periphery of the sensed image from matching with the reference map.

As mentioned previously, correlation addition, as disclosed and claimed herein, has been developed to increase the match area and, hence, the amount of information available to the correlator and thereby increase its effectiveness, particularly for matching degraded scenes. Furthermore, through the use of correlation addition, an effectively larger FOV composed of individually matched sensed images can be formed by using the airframe guidance data to make a mosaic or synthetic FOV, much longer than the single sensed image FOV. Also, the formation of a synthetic FOV avoids the geometric degradation in correlation that accompanies a larger single sensed image FOV.

Figure 4:
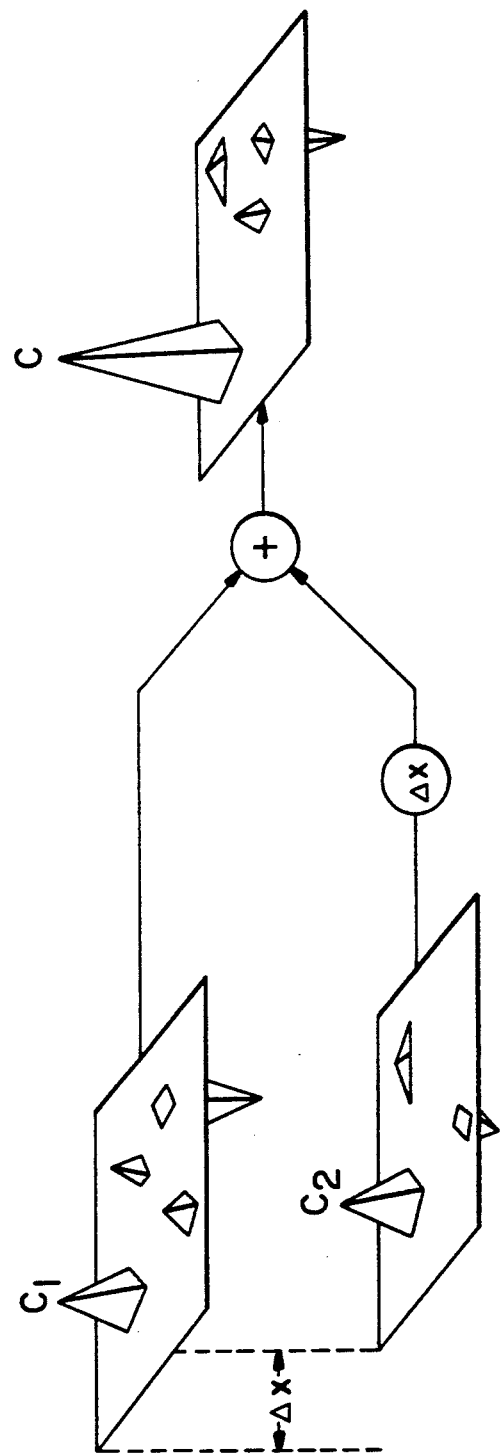
FIG. 4 is a schematic representation of the coherent correlation addition methodology.

Correlation addition is the superposition of a sequence of individual correlation surfaces produced during airframe overflight of a reference area. Each point, $C_n$, in FIG. 4 is the location of a match point (peak or anti-correlation peak) in a single sensed image correlation surface. After shifting the correlation surfaces relative to a common reference location to account for missile velocity, altitude and attitude ($\Delta X$ in FIG. 4), $C_1$ and $C_2$ overlay each other (i.e., they are coherently added) and contribute to identification of point C in the composite surface.

Figure 5:
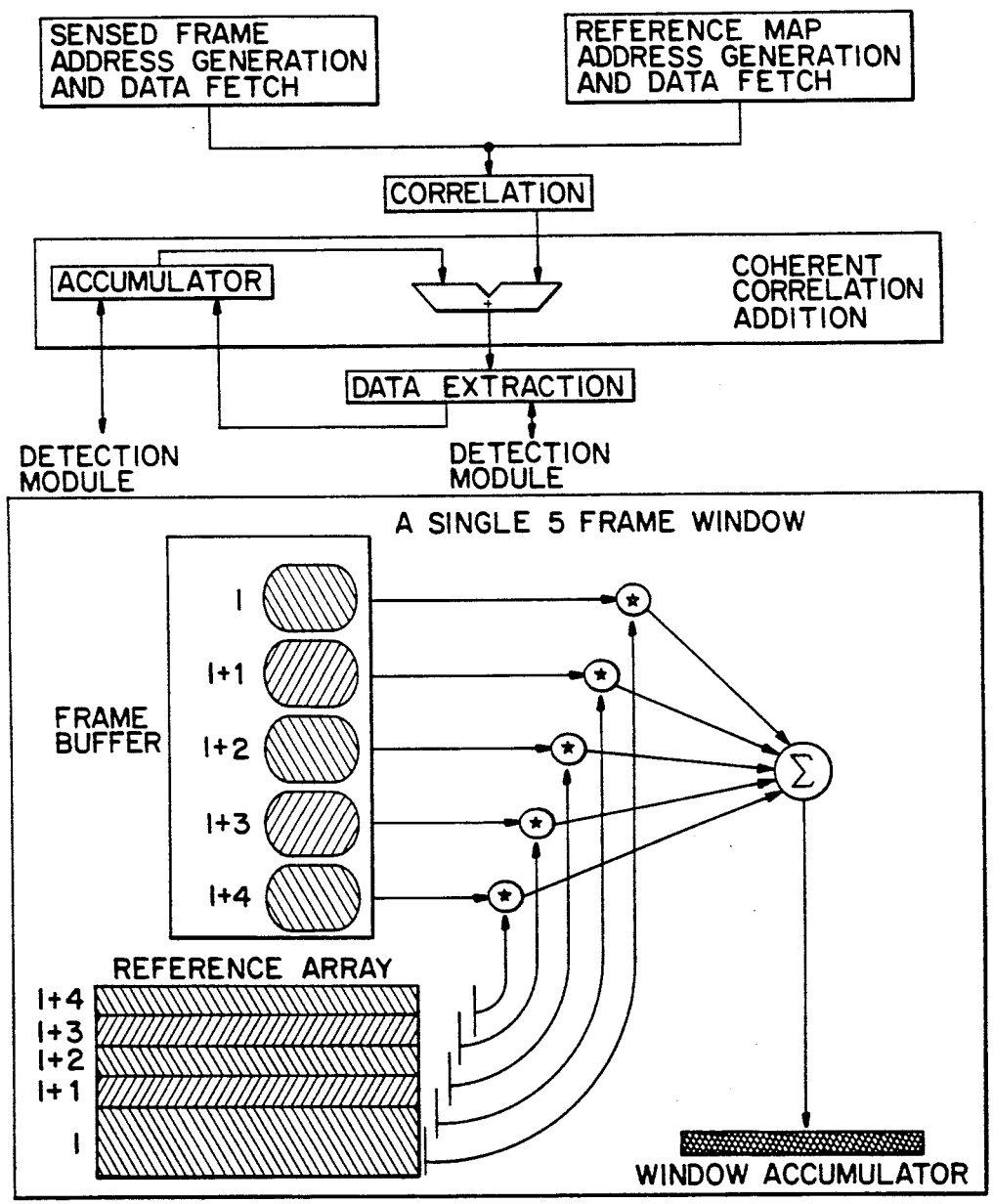
FIG. 5 is a schematic representation of the correlation addition process.

For longer sequences of single sensed image correlation surfaces, each surface is simply offset with respect to the first surface (the reference location) in the sequence and then added so that match point amplitude (wherever it occurs) stays relatively constant while the averaged correlation sidelobes decrease. (The offsets are provided by the system controller, which relates the positions of the correlation surfaces to each other based on calculations using camera magnification, imaging frequency, and airframe flight data.) The correlation surfaces will be independent (except at the match point) when the individual frames do not overlap each other and partially independent when they do. FIG. 5 is a schematic representation of this process.

A bipolar image that represents ground truth, over a large area, during the airframe overflight of the reference area, is defined as r'(n,m). (For correlation addition, the reference map size, NxM, is selected to ensure that at least one sequence of I sensed images is taken from the ground area corresponding to the reference, r.) The upper left positions of the sequence of sensed images, in the region of support of the reference map r(n,m), are defined as the set $\{n_i,m_i\}$ where element $n_i,m_i$ corresponds to time $t_i$ in the sequence. Then $$s_i(k,l) = r'(n_i + k, m_i + 1) \quad 0 \leq k \leq K - 1 \quad (3)$$
$$0 \leq l \leq L - 1$$
$$t_o = 0, \; t_i < t_j \text{ for } i < j.$$
$$n_o, m_o = 0$$

It is assumed, for the purposes of correlation addition, that $\{n_i,m_i\}$ are known, via inertial guidance data, to the requisite precision.

Correlation addition can now be defined as:

$$\text{For } c_i = s_i \; r \qquad (4)$$
$$c(n,m) = \sum_{i=0}^{I-1} c_i(n + n_i, m + m_i)$$

where, in this equation, c(n,m) is the composite correlation surface, and I is the number of individual correlation surfaces (from I sensed images) added.

The most likely position of the sensed image, s, in the reference, r, can be shown to be $$n_m, m_m = n',m': |c(n',m')| > |c(n,m)|$$

for all $n,m$ where $(n_m,m_m)$ is the match coordinate (point). (If the likelihood of an update's correctness is too low, it will be rejected by the detector which thresholds the correlation extremes relative to the sidelobes, the PSR.) The position of the largest PSR (which includes anti-matches or anti-correlations (antipeaks)) is used as the candidate location of the sensed images, in the reference map r(n,m).

However, there is an implicit uncertainty due to guidance system position errors, in the true position of the $s_i$ in equation (eq.) (3). We express this uncertainty as an unknown translation of the prepared reference r with respect to the ground truth r'. Thus $$s_i(k,l) = r'(n_i + n_p + k, \; m_i + m_p + l)$$

where $(n_p,m_p)$ are the translation of r' with respect to r, the parameters we wish to estimate for the navigation update. (The match of r with r' is at point $(n_p,m_p)$, i.e., $(n_m,m_m)=(n_p,m_p)$.) $(n_p,m_p)$ is also the position of the airframe with respect to the on board reference map at $t_o$, the time at which $s_o$ (first frame) was acquired.

Applying the above formula for $s_i(k,l)$ to the formulation of correlation addition (eq. (4)) yields:

$$c(n,m) = \sum_{i=0}^{I-1} \sum_{k=0}^{K-1} \sum_{l=0}^{L-1} r(n + n_i + k, m + \qquad (5)$$

$$m_i + l) r'(n_i + n_p + k, m_i + m_p + l),$$

and max [c(n,m)] occurs at $(n_p,m_p)=(n_m,m_m)$. Correlation addition as defined preserves the position of our match estimate.

Each composite correlation surface represents an attempt to match a sequence of sensed images (i.e., one synthetic FOV) with the reference map. When the airframe is positioned over the reference area for one of these sequences, an update is expected. Detection processing thresholds each correlation surface, looking for correlation peaks (or anti-correlation peaks). If the PSR (APSR) in a correlation surface is high (low) enough to satisfy the probability criterion that the peak (anti-correlation peak) is correct, the position of the peak (anti-correlation peak) is accepted as the position of the camera boresight on the ground. (Note, each location in a correlation surface has an associated PSR or Antipeak-to-Sidelobe Ratio (APSR) which are more "robust" match measures than just peak/anti-correlation peak values; the location of greatest PSR and APSR in a correlation surface are the match/anti-match points, respectively.)

Figure 6:
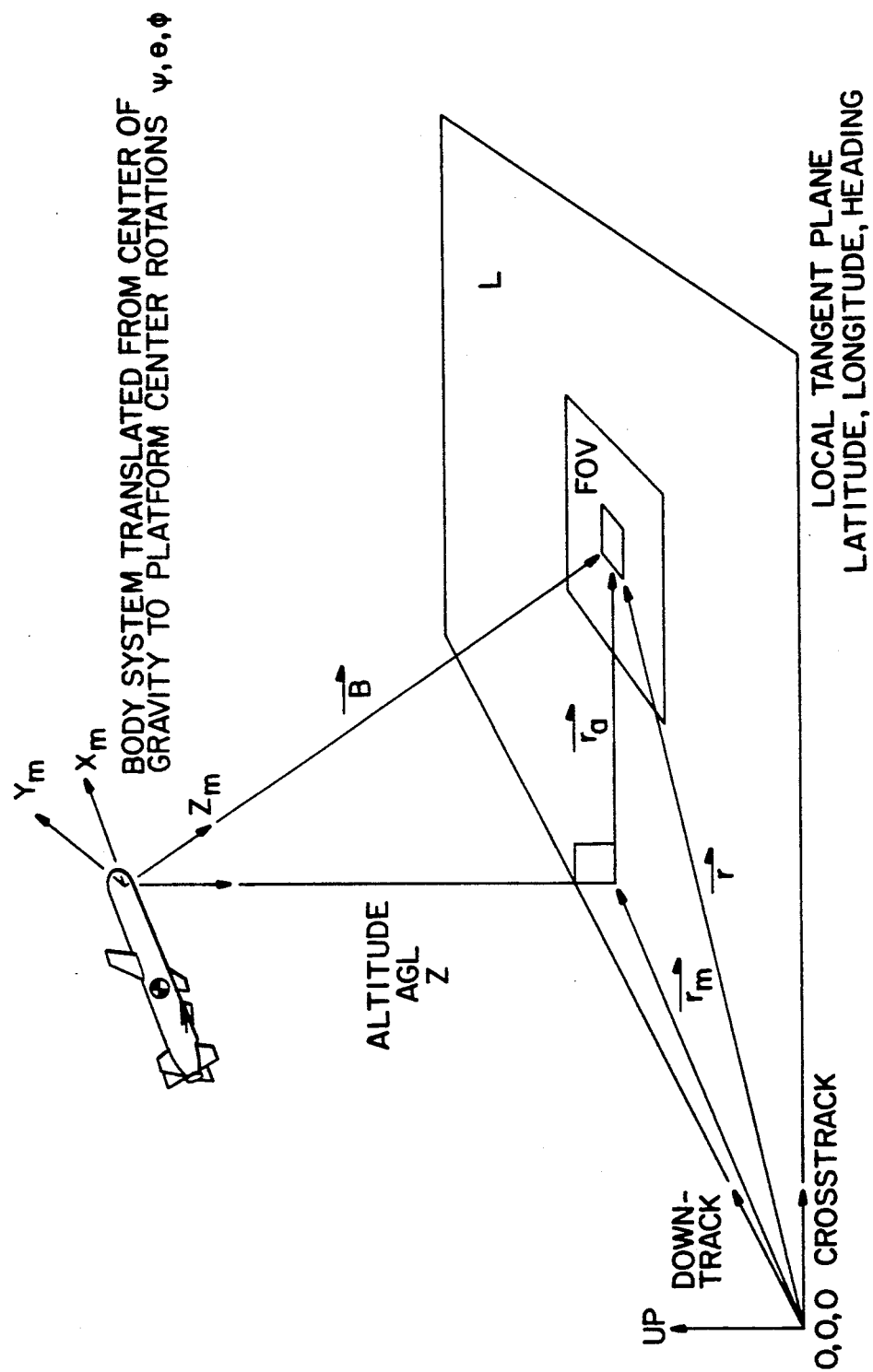
FIG. 6 is a schematic representation of airframe attitude geometry and FOV location.

The apparent motion of the correlation peak as the airframe moves downtrack and acquires a sequence of sensed images is now addressed. The position of the peak in a correlation surface, assuming that the sensed image was taken from the reference area, should be the position of the intersection of the flight camera boresight with the ground, offset for the size of the FOV (FIG. 6). In the coordinate system of FIG. 6, the match position for sensed image i is $n_i,m_i$.

To see how a mosaic or synthetic field of view is formed during correlation addition, consider the $j^{th}$ composite surface $$c^j(n,m) = \sum_{i=j}^{i=j+I-1} c_i(n + n_{ji}, m + m_{ji})$$

and expand using the definition of $c_i(n,m)$:

$$c^j(n,m) = \sum_{i=j}^{j+I-1} \sum_{k=0}^{K-1} \sum_{l=0}^{L-1} s_i(k,l) r(n + n_{ji}, m + m_{ji}).$$

By changing the order of on and changing the indices of summation, we arrive at $$c^j(n,m) =$$

$$\sum_{k=-\infty}^{\infty} \sum_{l=-\infty}^{\infty} r(n + k, m + l) \sum_{i=j}^{j+I-1} s_i(k - n_{ji}, l - m_{ji})$$

where we have made use of the extended reference (which is zero outside the map) and frames as in eq. (1) and (2). We can now see that $$s^j(k,l) = \sum_{i=j}^{j+I-1} s_i(k - n_{ji}, l - m_{ji}) \qquad (6)$$

is a synthetic frame, having a region of support larger than KxL, such that $$c^j = r \; s^j.$$

This result provides a convenient mechanism for understanding how overlapped frames, i.e., when $V_{DTC} T < K$ (where $V_{DTC}$ is airframe downtrack velocity in cells per second and T is time interval between sensed scenes (frames)), are processed by the correlation adder.

From eq. (6), we see that overlapped frames will cause $s^j$ to have values other than $\{-1,1\}$ in the region of support. For instance, when two frames overlap, if overlapped cells each have the same value, then $s^j = \{-2,2\}$. If they have different values, $s^j = 0$. Hence the correlation adder naturally weights the correlation of overlapped frames plausibly: if two cells agree, the composite contribution is twice the single frame contribution. If they disagree, a no-match occurs for those cells. (Disagreement can come from various noise sources, phase difference between the two sample lattices (e.g., ½ cell) or sensor signature.) When three frames overlap, $$s^j = \{-3, -1, 1, -3\},$$

and so on. A visual simulation of this methodology can be seen in FIG. 4.

The model of correlation addition as the formation of a long (downtrack direction) synthetic FOV illustrates two important phenomena. The geometric distortion induced loss in peak amplitude of the synthetic FOV correlation is just the average geometric loss of the individual FOVs as long as the accuracy of guidance data during the time that the FOVs were acquired is much better than the peak width (correlation length). The second phenomenon deals with overlapped sensed images. If the velocity is low and the ground projection of the image cell is large, adjacent sensed images overlap. The overlapped areas are doubly weighted by the correlation addition as just discussed.

Figure 7:
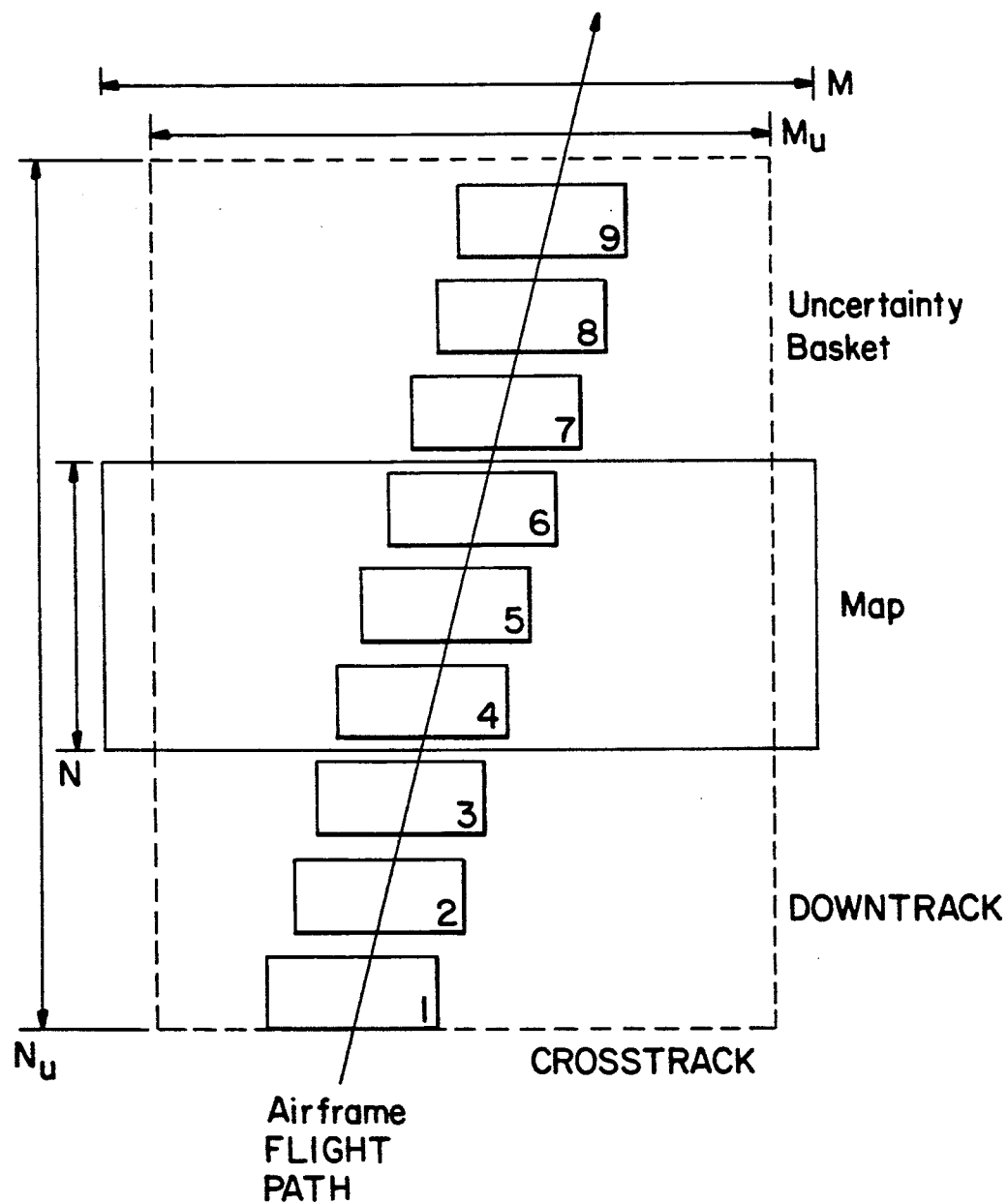
FIG. 7 is a schematic representation of moving window correlation addition.

Once a sequence of I sensed images is available to the correlation processor, a process called moving window correlation addition begins. As each new sensed image arrives during overflight of the scene, the oldest individual correlation surface is dropped from the averaging operation (FIG. 7) by subtracting it from the composite. This recursive moving window average operation continues until an update is found or until the last image, P, is acquired for each respective reference. P is the total number of sensed images to be acquired to ensure that the ground spanned by the sequence is greater than the reference map downtrack length and position uncertainty, $N_u$.

Figure 9:
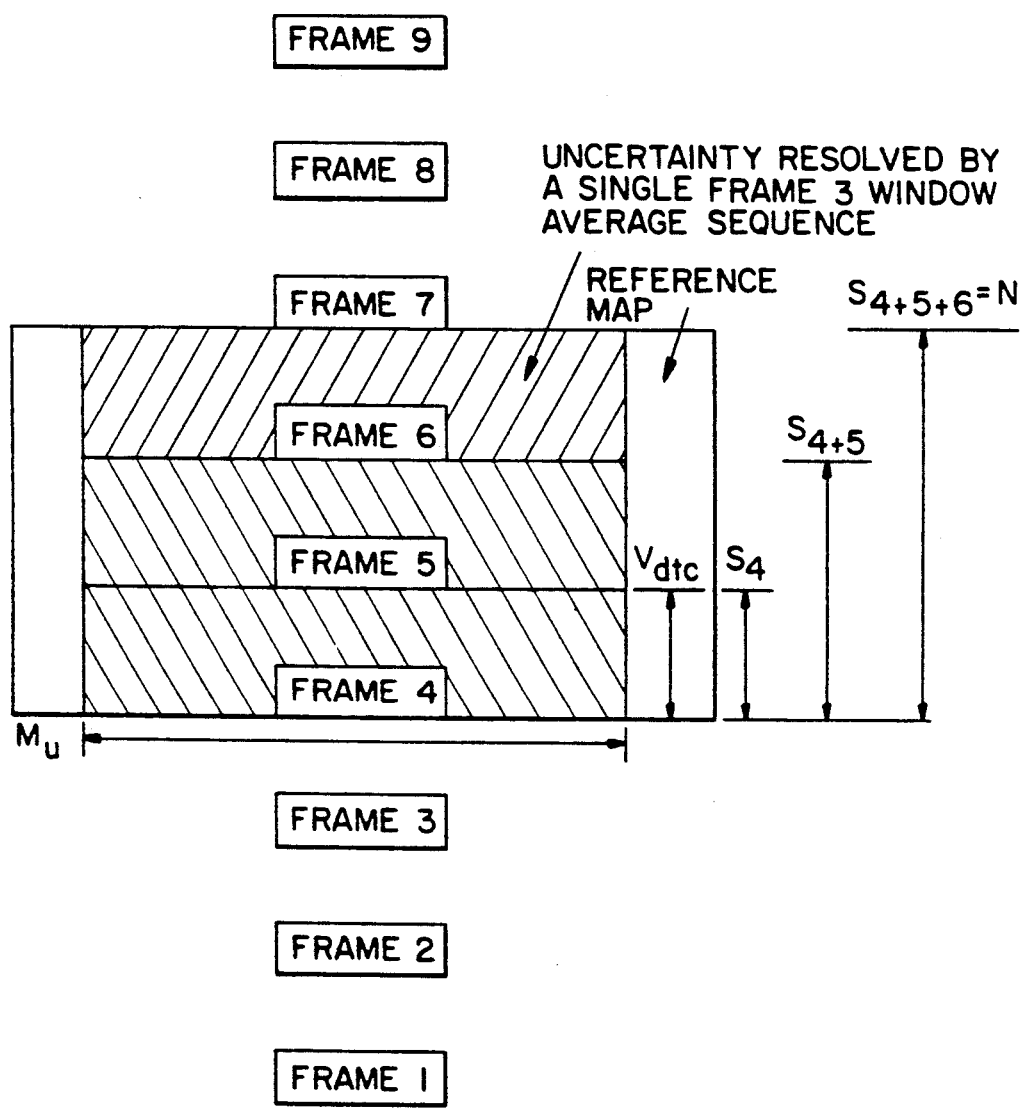
FIG. 9 is a schematic representation of the downtrack uncertainty resolution.

The coherent correlation addition process is depicted in FIG. 8 for a three-frame window average. FIG. 8E shows the extent of the composite correlation surface after the single window average process is complete. The correlation addition process is optimized by ensuring that each individual correlation surface generated during a window average sequence is sized exactly equal to the valid search region. This is the area from which a valid peak (anti-correlation peak) is found and from which the statistics must be obtained. This area is typically smaller than the individual correlation surface obtained by cross correlating a single sensed image against the entire reference map. Note that the sequence of three-sensed image correlation additions in conjunction with airframe velocity, altitude and attitude does determine airframe position within the complete reference map region (FIG. 9). The entire reference map region is searched, but in three strips. As stated earlier, if an update is not found in the composite correlation surface, the moving window average process continues until an update is found or until the last sensed image, P, is processed for the reference area. (Note, while three frames are used in the above example, correlation addition will work with two or more frames, i.e., it is not limited to three frames.)

Mathematically, moving window correlation addition can be described as follows: For $c^j = j^{th}$ correlation addition where $j = [0, P - I]$, we define $$c^j = \sum_{i=j}^{j+I-1} c_i(n + n_i, m + m_i). \quad (7)$$

Hence the $j^{th}$ composite surface is the addition of the j, j+1,...j+I-1 surfaces from the correlation of an I-frame subsequence of the total P frames acquired.

Eq. (7) may be expressed recursively as $$c^j = c^{j-1} - c_{j-1} + c_{j+I-1}$$

for $j \geq I$, where $$c_{j-1} = c_{j-1}(n + n_{j-1}, m + m_{j-1}).$$

This equation will only produce valid surfaces for $$0 \leq n + n_j \leq k + V_{DTC}T - 1$$

the search region of the composite. However, $$n_j = jV_{DTC}T$$

and since $P \geq I$, we will always have the situation where invalid correlations are used to form $c^j$. This is a consequence of the uncertainty $N_u$ being larger than the downtrack extent of the I frame long strip of sensed images. To correct this situation, we define $$n_{ij} = n_j - n_i.$$

$n_{ij}$ is the relative offset in position between the $i^{th}$ and $j^{th}$ frames. Then eq. (7) becomes $$c^j = \sum_{i=j}^{j+I-1} c_i(n + n_{ji}, m + m_{ji}).$$

Replacing $n_i$ and $m_i$ in eq. (5) with $n_{ji}$ and $m_{ji}$, we have $n = n_p + n_j = n_m$, the downtrack match and $m = m_p + m_j = m_m$, the crosstrack match. For $$0 \leq n \leq V_{DTC}T - 1, \; n_j = jV_{DTC}T$$

we have $$0 \leq n_p + n_j \leq V_{DTC}T - 1$$

or $$0 \leq n_p + j\,V_{DTC}T \leq V_{DTC}T - 1.$$

Thus, the region of candidate downtrack position estimates for composite correlation $c^j$ is $$-jV_{DTC}T \leq n_p \leq -V_{DTC}T(j-1) - 1.$$

The downtrack uncertainty basket is searched in $V_{DTC}T$ strips, with each subsequent strip $V_{DTC}T$ cells further along the airframe track.

Figure 10:
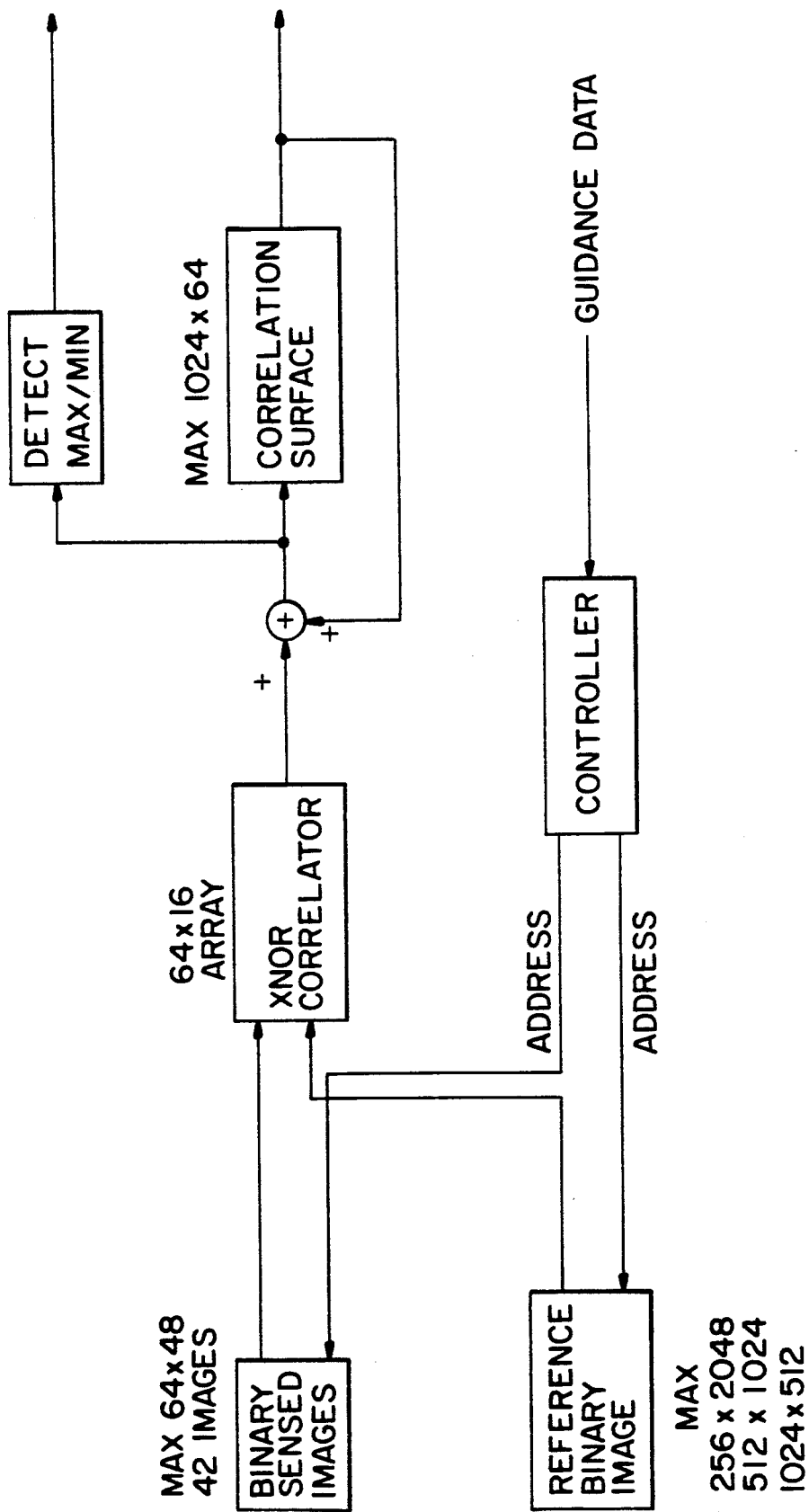
FIG. 10 is a hardware block diagram of correlation processing.

As shown in FIG. 10, correlation of single bit images is implemented in hardware using the logical Exclusive Not-Or (XNOR), and the result of XNORing the sensed image with the reference is summed to obtain the correlation at the offset. This is not a product correlation, but it can be shown to be a linear transform of one. By mapping the XNOR correlation of single bit images to a product correlation of bipolar ($\pm 1$) images, the equivalence of averaging correlation surfaces to the use of a mosaic sensed image can be shown.

The bipolar correlation, c(n,m), is defined and discussed above as a product correlation of images that are ($\pm 1$) within a region of support and 0 otherwise with the region of support for the sensed image assumed to be smaller than the region of support for the reference image.

The binary correlation using single bit images is defined as $$r' = r, r > 0 \qquad s' = s, s > 0$$
$$= 0 \text{ otherwise} \qquad = 0 \text{ otherwise}$$

($r'$ and $s'$ are map and frame intensity, respectively, either 1 or 0)

$$c'(n,m) = \sum_k \sum_l r'(n + k, m + l) \oplus s'(k,l)$$
$$= r' \ \overline{\oplus} \ s'$$

where $\oplus$ is the XNOR operation and $\overline{\oplus}$ denotes binary correlation. By noting that $$s' \oplus r' = \frac{(s + r)^2}{4}$$

then $$c'(n,m) = \frac{KL}{2} + \frac{c(n,m)}{2}$$

The binary correlation is the correlation performed by the image matching system hardware. It is more efficient than the bipolar correlation since fewer bits are needed to represent an image, and the correlation hardware is simpler. However, the binary correlation and bipolar correlation are simply related by the equation for c'(n,m) just above.

Correlation addition is mechanized as $$c_j = \sum_{i=j}^{I+j-1} c_i(n - n_i, m - m_i)$$

for hardware reasons. Each sensed image is correlated with the reference, and the resulting correlation surface is position shifted, then added to the previous series of correlation surfaces.

The implementation of correlation addition for real time scene matching exacerbates the already high computational complexity of correlation in prior art systems. The correlation addition algorithm needs to be implemented conservatively with respect to computational resources. The obvious approach is to simply compute each correlation surface, shift its coordinates appropriately, and add. This is denoted as the direct implementation. A second approach, in which only the portion of each $c_i$ needed to form each composite correlation is computed, is the minimum memory and minimum computation approach, and will be denoted the minimal approach.

The modus operandi of the direct approach is to individually correlate frames j to j+I=1 with the reference, shift the surfaces by $n_{ji}$ and $m_{ji}$ and then perform the summation, as in:

$$c_j = \sum_{i=j}^{j+J-1} c_i(n + n_{ji}, m + m_{ji})$$

Each correlation $c_i$ need only be computed once if we apply a recursive scheme. The minimal approach correlates each of an I long sequence of sensed images, $s_i$, with the reference. However, only correlations at the offsets within the region defined by $n \leq V_{DTC}T - 1$ are computed. That is, each $s_i$ is correlated over the area of r that when shifted with the appropriate $n_{ji}$, $m_{ji}$ will lie in $0 \leq n \leq V_{DTC}T - 1$.

Figure 11:
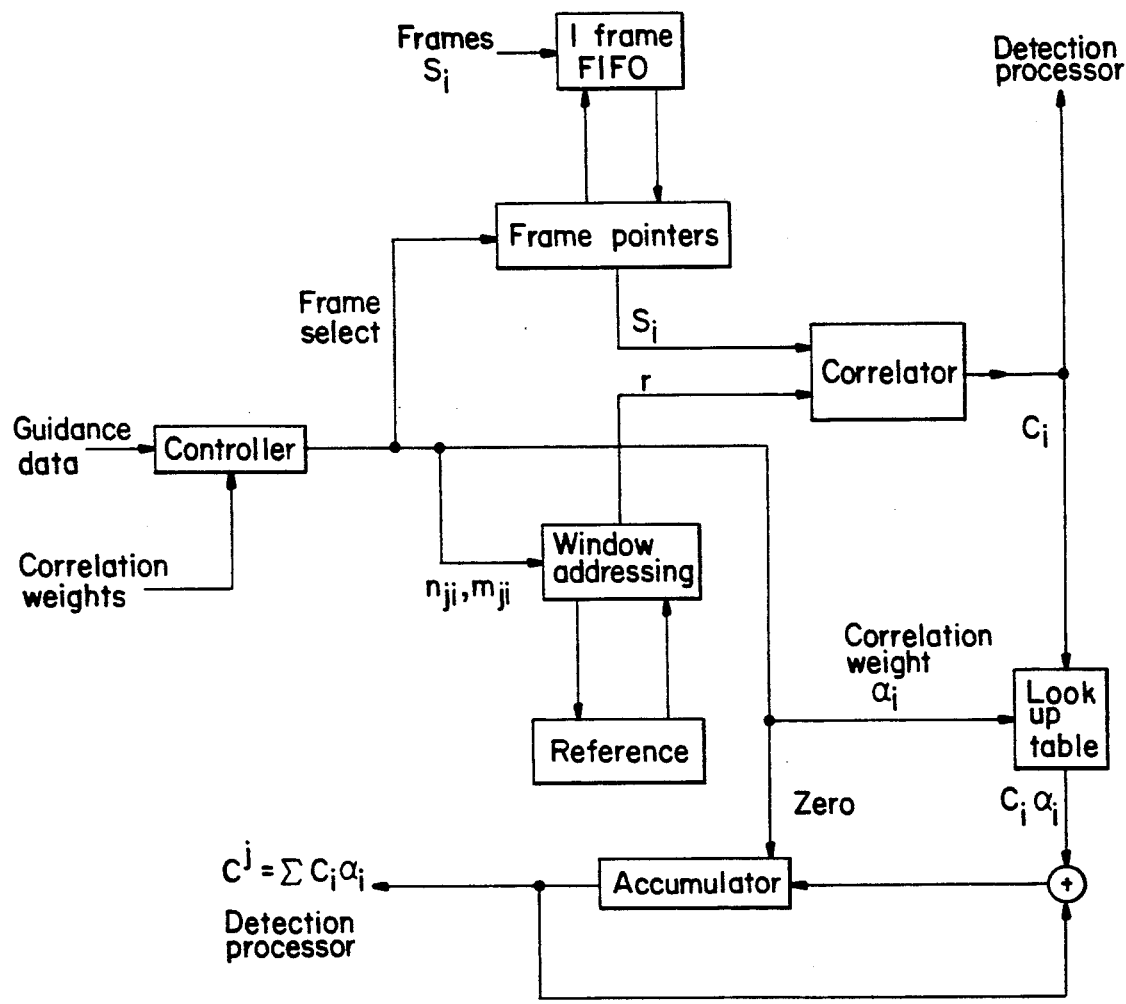
FIG. 11 is a functional block diagram of a correlation addition processor.

FIG. 11 shows an architecture for implementing the minimal approach.

The subsequence of I frames are held in a FIFO buffer, in which a frame $s_i$ may be accessed via a pointer, under the control of the processor controller. As each new frame arrives, the oldest frame in the buffer is flushed.

Concurrently, the controller receives guidance data, and computes the $\{n_{ji}, m_{ji}\}$ for the current $\{s_i\}$. Correlation weight functions $\alpha_i$ are provided by a separate module in the system, e.g., the detection processor.

A table of correlation 'window' addresses, using $\{n_{ji}, m_{hu}\}$, select the portion of the reference to correlate with s. The correlation result is multiplied by $\alpha_i$ using a lookup table, and is also sent to the detection processor where the weight factor is computed for a new frame.

The weighted $c_i$ are summed into an accumulator, and also made available to the detection processor for extracting the candidate position fix, and determining whether or not it is likely to be correct.

What we claim is:

1. A method for increasing match area in an image matching system comprising the step of combining at least two correlation surfaces to form a composite correlation surface, wherein each correlation surface is formed by;
    comparing a sensed image to a reference image at every location in said reference image at which said sensed image is entirely within said reference image; and
    computing a correlation amplitude for each location of said sensed image in said reference image, said correlation amplitudes forming said correlation surface.

2. The method of claim 1, wherein said combining step comprises the step of adding coherently said correlation surfaces.

3. The method of claim 2, wherein said adding step comprises the step of superposing said correlation surfaces using data which relate said correlation surfaces to each other.

4. The method of claim 2, wherein the match point correlation amplitude for each of said correlation surfaces are coherently added.

5. The method of claim 2, wherein the anti-match point correlation amplitude for each of said correlation surfaces are coherently added.

6. A method for matching a sequence of sensed images with a reference map comprising the steps of:
   correlating at least two of said sensed images with said reference map to generate a correlation surface for each of said sensed images comprising the steps of:
      comparing each of said sensed images to said reference map at every location in said reference map at which said sensed image is entirely within said reference map, and
      computing a correlation amplitude for each location of said sensed image in said reference map, said correlation amplitudes forming said correlation surface;
   combining said correlation surfaces to form a composite correlation surface; and
   determining a match point for said sequence of sensed images in said reference map using said composite correlation surface.

7. An image matching method comprising the steps of:
   acquiring a sequence of sensed images with at least two of said sensed images being located within a reference map;
   correlating each of said sensed images with said reference map to generate a correlation surface for each of said sensed images comprising the steps of:
      comparing each of said sensed images to said reference map at every location in said reference map at which said sensed image is entirely within said reference map, and
      computing a correlation amplitude for each location of said sensed image in said reference map, said correlation amplitudes forming said correlation surface;
   combining said correlation surfaces to form a composite correlation surface; and
   determining a match point for said sequence of sensed images in said reference map using said composite correlation surface.

8. The method of claim 6 or 7, wherein said combining step comprises the step of coherently adding said correlation surfaces.

9. The method of claim 8, wherein said adding step comprises the step of superposing said correlation surfaces using data which relate said correlation surfaces to each other.

10. The method of claim 8, wherein the match point correlation amplitude for each of said correlation surfaces are coherently added.

11. The method of claim 8, wherein the anti-match point correlation amplitude for each of said correlation surfaces are coherently added.

12. The method of claims 6 or 7, wherein said determining step comprises the steps of:
   searching said composite correlation surface for a maximum correlation amplitude that exceeds an upper threshold value and for a minimum correlation amplitude which is below a lower threshold value; and
   using either said maximum or minimum correlation amplitude to determine said match point.

13. The method of claim 12, wherein said searching step further comprises the step of adjusting said upper and lower threshold values based on the standard deviation of actual correlation amplitudes excluding the extremes.

14. The method of claims 6 or 7, further comprising the steps of:
   forming a new composite correlation surface when said match point cannot be determined using said composite correlation surface; and
   redetermining a match point for said sequence of sensed images in said reference map using said new composite correlation surface.

15. The method of claim 14, further comprising the step of repeating said forming and redetermining steps of claim 14 until said match point is determined or until the last acquired of said sensed images located in said reference map is correlated, whichever occurs first.

16. The method of claim 14, wherein said forming step comprises the steps of:
   subtracting from said composite correlation surface said correlation surface generated from the oldest acquired of said sensed images; and
   adding to said composite correlation surface said correlation surface generated from the latest acquired of said sensed images to form a new composite correlation surface.

17. The method of claim 12, wherein said using step comprises the steps of:
   computing peak-to-sidelobe ratio (PSR) and antipeak-to-sidelobe (APSR) ratio for said composite correlation surface using said maximum and minimum correlation amplitudes; and
   using either said PSR or APSR to determine said match point.

18. The method of claims 6 or 7, wherein said correlating step further comprises the step of generating only that portion of said correlation surface for each of said sensed images needed to form said composite correlation surface.

19. An image matching method comprising the steps of:
   acquiring a sequence of sensed images with at least three of said sensed images being located within a larger reference map;
   correlating each of said sensed images with said reference map to generate a correlation surface for each of said sensed images comprising the steps of:
      comparing each of said sensed images to said reference map at every location in said reference map at which said sensed image is entirely within said reference map, and
      computing a correlation amplitude for each location of said sensed image in said reference map, said correlation amplitudes forming said correlation surface;
   adding coherently said correlation surfaces to form a composite correlation surface;
   searching said composite correlation surface for a maximum correlation amplitude that exceeds an upper threshold value and for a minimum correlation amplitude which is below a lower threshold value wherein said upper and lower threshold values are adjusted based on the standard deviation of actual correlation amplitudes excluding the extremes;
   computing peak-to-sidelobe ratio (PSR) and antipeak-to-sidelobe ratio (ASPR) for said composite correlation surface using said maximum and minimum correlation amplitudes;
   using said PSR or APSR to determine a match point of said sequence of sensed images in said reference map;

forming a new composite correlation surface when said match point cannot be determined using said composite correlation surface comprising the steps of:
  subtracting from said composite correlation surface said correlation surface generated form the oldest acquired of said sensed images; and
  adding to said composite correlation surface said correlation surface generated from the latest acquired of said sensed images to form said new composite correlation surface;
redetermining said match point of said sequence of sensed images in said reference map using said new composite correlation surface; and
repeating said above forming and redetermining steps until said match point with greatest PSR or APSR is determined or until the last acquired of said sensed images located in said reference map is correlated, whichever occurs first.

20. A correlation processor comprising:
means for correlating a sequence of sensed images with a reference map to generate a correlation surface for each of said sense images, said correlating means comprising:
  means for comparing each of said sensed images to said reference map at every location in said reference map said correlation amplitudes forming said correlation surface;
means for combining said correlation surfaces to form a composite correlation surface; and
means for determining a match point for said sequence of sensed images in said reference map using said composite correlation surface.

21. The correlation processor as recited in claim 20, wherein said combining means comprises means for adding coherently said correlation surfaces.

22. The correlation processor as recited in claim 21, wherein said adding means comprises means for superposing said correlation surfaces using data which relate said correlation surfaces to each other.

23. The correlation processor as recited in claim 22, wherein said determining means comprises:
  means for searching said composite correlation surface for a maximum correlation amplitude which exceeds an upper threshold value and for a minimum correlation amplitude which is below a lower threshold value; and
  means for using either said maximum or minimum correlation amplitudes to determine said match point.

24. The correlation processor as recited in claim 23, wherein said determining means further comprises means for adjusting said upper and lower threshold values based on the standard deviation of actual correlation amplitudes excluding the extremes.

25. The correlation processor as recited in claim 24, further comprising:
  means for forming a new composite correlation surface when said match point cannot be determined using said composite correlation surface, said forming means comprising:
    means for subtracting from said composite correlation surface said correlation surface generated from the oldest acquired of said sensed images; and
    means for adding to said composite correlation surface said correlation surface generated from the latest acquired of said sensed images to form said new composite correlation surface;
  means for redetermining said match point of said sequence of sensed images in said reference map using said new composite correlation surface; and
  means for repeating said above forming and redetermining steps until said match point is determined or until the last acquired of said sensed images located in said reference map is correlated, whichever occurs first.

26. The correlation processor as recited in claim 25, wherein said correlating means further comprises means for generating only that portion of said correlation surface for each of said sensed images needed to form said composite correlation surface.

* * * * *

UNITED STATES PATENT AND TRADEMARK OFFICE
CERTIFICATE OF CORRECTION

PATENT NO. : 5,146,228
DATED : September 8, 1992
INVENTOR(S) : Geoffrey B. Irani, Kim T. Constantikes and Gary D. Shiflett It is certified that error appears in the above—identified patent and that said Letters Patent is hereby corrected as shown below:

Column 15, line 29, between "map" and "said" insert:

-- at which said sensed image is entirely within said reference map, and means for computing a correlation amplitude for each location of said sensed image in said reference map, --

Signed and Sealed this

Twenty-first Day of September, 1993

Attest:

BRUCE LEHMAN

Attesting Officer

Commissioner of Patents and Trademarks